United States Patent [19]
Modavis

[11] Patent Number: 5,818,988
[45] Date of Patent: Oct. 6, 1998

[54] METHOD OF FORMING A GRATING IN AN OPTICAL WAVEGUIDE

[75] Inventor: Robert A. Modavis, Painted Post, N.Y.

[73] Assignee: Corning Incorporated, Corning, N.Y.

[21] Appl. No.: 844,005

[22] Filed: Apr. 18, 1997

[51] Int. Cl.$^6$ ........................................... G02B 6/38

[52] U.S. Cl. .................. 385/37; 385/10; 359/562; 430/5

[58] Field of Search .................. 385/37, 10, 27, 385/14; 359/570, 566, 562; 430/4, 5, 2, 321

[56] References Cited

U.S. PATENT DOCUMENTS 5,066,133  11/1991  Brienza ................................. 385/37 X

*Primary Examiner*—Phan T. H. Palmer
*Attorney, Agent, or Firm*—William J. Chervenak

[57] ABSTRACT

A method and apparatus for writing a Bragg grating in a photosensitive optical waveguide is disclosed. The novel method comprises an interferometer having precisely adjustable light collecting and directing components. A phase mask illuminated with ultraviolet light is used as the interferometer light source. The adjustability of the interferometer allows the writing of Bragg gratings for filtering wavelengths in the range 1275 nm to 1575 nm while adjusting the appropriate interferometer elements by only +/−0.75° each.

16 Claims, 3 Drawing Sheets

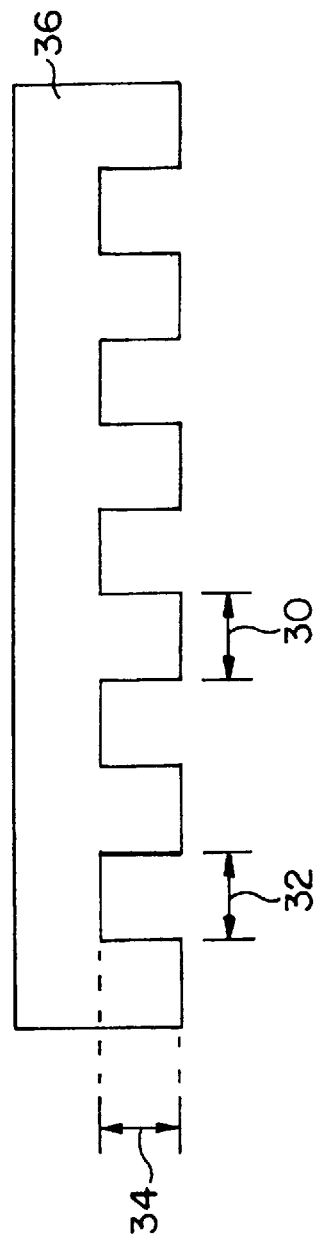

METHOD OF FORMING A GRATING IN AN OPTICAL WAVEGUIDE

This application takes the priority of Provisional application Ser. No. 60/014023 and was filed on Mar. 25, 1996.

BACKGROUND OF THE INVENTION

The invention is directed to a method of forming a Bragg reflection grating in an optical waveguide fiber. More particularly, the method includes the use of a tunable phase mask in making the grating.

The sensitivity of optical waveguide fibers to light of certain wavelength and intensity has been known since the late 1970's. It was found that the loss characteristic and refractive index of a waveguide fiber could be permanently changed by exposing the waveguide to light of a given wavelength and intensity. A publication which describes the effect and how it may be used is, "Light-sensitive optical fibers and planar waveguides", Kashyap et al., BT Techno., 1, Vol. 11, No. 2, April 1993. The publication discusses the making of light-induced reflection gratings, page 150, section 2.1, and notes that the amount of refractive index change increases as light wavelength is reduced from 600 nm to 240 nm, where the photosensitivity of the waveguide appears to peak. The first gratings made using photosensitivity, employed counter propagating coherent light beams in the fiber. The resulting interference pattern produced a periodic variation in waveguide refractive index which behaved as a Bragg reflection grating. A physical explanation of the photosensitive effect is given in the Kashyap paper at page 151, section 3.

Such a Bragg grating is useful as a wavelength filter. A Bragg grating in a waveguide fiber will selectively filter propagated light having wavelength which is twice the period of the grating. Because systems employing waveguide fibers may use wavelength division multiplexing, a method and apparatus for forming Bragg filters, for a range of wavelengths, is highly desirable. Furthermore, such a method and apparatus must be efficient, economical, precise, and simple, to insure method speed, repeatability and accuracy. Such a method lends itself to a production environment wherein it is possible to produce in volume, narrow band filters, effective at pre-selected wavelengths, for use in sophisticated systems such as those using wavelength division multiplexed communication signals.

There are, of course, a large number of ways in which the filtering capability of a reflection grating can be used to yield information. The strain gauge, discussed in U.S. Pat. No. 4,725,110, Glenn et al., is an example.

The method for forming a grating within a waveguide fiber described in U.S. Pat. No. 4,725,110, Glenn et al., is illustrated in FIG. 1 of that document. Here a Bragg grating is formed by irradiating the waveguide fiber from the side as compared to the method wherein light is propagated through the waveguide, earlier cited. In addition, the formation of the grating is done using an interferometer. A drawback of this method of forming a grating is that, if gratings of different period are required, the positions of the interferometer source and optical elements must be adjusted. Also, the interferometer source disclosed in the patent is two beams emerging from a beam splitter. The efficiency, light control, and flexibility of a beam splitter source is limited in comparison to a phase mask source.

A publication, "Deep-UV spatial-frequency doubling by combining multilayer mirrors with diffraction grating", Hawryluk et al, J. Vac.Sci., B, Vol 1, No. 43, October–December 1983, shows, in FIG. 3, p. 1202, a basic set up of an interferometer having a grating as input light source to the interferometer. The grating forming method or apparatus of this publication does not address the problem of forming gratings of different period in a waveguide fiber.

In U.S. Pat. No. 5,327,515, Anderson et al., a light source is directed onto a phase mask by means of a lens. Different orders of diffraction emerge from the phase mask and are directed onto a waveguide fiber by means of a second lens, as is shown in FIG. 2 of that patent. The different diffraction orders interfere to produce a fringe pattern on the waveguide. The period of the phase mask grating is an integral multiple of the fringe pattern period illuminating the waveguide. The integer refers to the higher of the two orders of interfering diffraction pattern.

The sharpness of the grating produced by the method of '515, Anderson et al., is limited by the quality of the lens or lenses used to focus the fringe pattern onto the optical waveguide. Lenses absorb light, thus placing more stringent requirements on the source. Furthermore, the number of grating periods possible is limited by the fact that light intensity decreases rapidly with increasing order of diffraction.

Anderson et al., '515 and U.S. Pat. No. 5,367,588, Hill et al., both make reference to the use of phase masks which incorporate at least two sections having periods different from each other, thereby allowing at least two gratings of different period to be formed in a waveguide fiber using a single phase mask. The inherent difficulties encountered using a phase mask grating having at least two periods are: the phase mask grating is complex and therefore difficult to manufacture accurately and precisely; and, the spatial separation of the gratings formed in the waveguide is limited by the spatial dimensions of the phase mask.

Thus there exists a need for a method and apparatus of forming gratings in a waveguide fiber which:

uses a single period phase mask for forming gratings in a waveguide fiber, wherein the gratings so formed may have a range of periods;

forms waveguide grating which have sharply defined refractive index interfaces; and, employs a means for adjusting grating period which is simple in design so that accuracy and precision in grating manufacture are readily achievable.

Definitions

An optical waveguide grating is a periodic variation in refractive index of the waveguide along the long axis of the waveguide.

Photo-sensitivity is an interaction between certain glass compositions and selected light wavelengths wherein incident light changes the refractive index or the loss characteristics of the irradiated glass.

Side writing is a technique for forming a grating in an optical waveguide fiber wherein light is caused to form an interference pattern on the side of a waveguide fiber and along a portion of the long axis of a waveguide fiber. The periodic light intensity pattern, produced by the light interference, induces a periodic change in refractive index along a portion of the long axis of the waveguide fiber.

A phase mask is essentially a transmission diffraction grating. More particularly, in the context of this document, a phase mask is a material, transparent to a selected range of wavelengths, formed into a plate having a pair of flat, parallel, opposing sides, wherein one of these sides has inscribed therein a set of periodically spaced lines. The depth of the inscribed lines may be chosen to provide a phase shift which is an integral multiple of π, thereby suppressing the zeroth order diffraction pattern. As an alternative, the zeroth order diffraction pattern may be eliminated by means of a beam stop located between the phase mask and the waveguide fiber. The angular extent of the diverging light rays exiting the phase mask at any point along the line grating may be characterized by an angle 2ρ.

SUMMARY OF THE INVENTION

The novel method and apparatus of this application meet the need for a process of forming accurate, precise grating in an optical waveguide fiber, where the method is simple and the apparatus is simple and durable, thereby making them practical for use in a manufacturing environment.

The invention of this application provides a method and apparatus for using a high powered UV light source, of relatively low coherence length, i.e., about 300 μm, together with a phase mask and an adjustable interferometer, to side write a grating in an optical waveguide fiber. Writing lasers of coherence length as low as 10 μm are effective for forming gratings. However, sources having longer coherence lengths provide greater flexibility in terms of the length of grating which can be written and the contrast thereof. Coherence lengths of 10 meters, such as is possible using a frequencey doubled argon ion laser are contemplated.

The adjustability of the interferometer enables one to adjust the periodicity of interference fringes formed on an interference plane. The long axis of a waveguide fiber is positioned in the interference plane and oriented so that the interference fringes, formed in the interference plane, intersect the waveguide fiber long axis.

The photo-sensitivity of the optical waveguide glass effectively copies or writes the fringe pattern along the long axis of the waveguide. That is, the light incident on the waveguide increases refractive index over the area of a constructive interference fringe, while refractive index is left unchanged over the area of a destructive interference fringe.

Thus a first aspect of the invention is a method for side writing a Bragg grating in an optical waveguide. A phase mask is positioned to receive light from a light source and diffract the light into an interferometer. The elements of the interferometer collect light rays from the phase mask and direct them to convergence, i.e., overlap, on a plane called the interference plane. Light rays exiting the phase mask, which have an optical path difference less than or equal to the source coherence length are thus caused to produce interference fringes on the interference plane. Because the collecting and directing elements of the interferometer are adjustable, the interference pattern is adjustable. In particular, the period of the fringe pattern is adjustable. Thus Bragg gratings, which filter a wavelength or narrow band of wavelengths selected from a range of wavelengths, may be written in a waveguide fiber.

A high intensity, monochromatic light source, in the ultraviolet wavelength range, i.e., in the range of about 100 nm to 400 nm, is particularly suited to side writing a grating in a silica based optical waveguide fiber. However, light wavelengths of 600 nm are effective for writing a grating in a waveguide fiber. A light source coherence length of about 100 μm produces a grating in the waveguide of sufficient length to provide high efficiency, greater than 99%, filtering. However, a coherence length of about 10 μm is sufficent to produce useful waveguide fiber gratings. An excimer laser is an excellent source of high intensity ultraviolet light, and, typically has a coherence length of about 300 μm. An excimer laser may be constructed to operate at several wavelengths including, 193 nm, 248 nm, 308 nm and 351 nm.

The collecting and directing elements of the interferometer may be selected from a group of elements including lenses, prisms, mirrors, and combinations of these. Mirrors are preferred because of their power efficiency. Further, the fringe spacing can be readily adjusted in the case where the interferometer includes a pair of adjustable opposing mirrors. The amount of the adjustment can be described by the angle included between the mirror plane and the phase mask plane, angle 24 in FIG. 2.

For a typical ultraviolet light source, having the required coherence length, an adjustment of the included angle of about +/−0.75°, of each of two mirrors, relative to an initial included angle of 90°, is sufficient to produce waveguide fiber gratings which are effective filters over the wavelength range of about 1275 nm to 1575 nm, a range which includes the two important telecommunications signal wavelengths near 1300 nm and 1550 nm, respectively. This family of filters may be written using a single mask. It will be understood that the invention may be used to write gratings over different wavelength ranges by selecting a phase mask having the appropriate period. For example, the invention can write gratings over the wavelength range 500 nm to 1275 nm, thereby covering an important part of the waveguide fiber communications wavelength range.

The period of the written grating changes from about 435 nm to 540 nm over the wavelength range 1275 nm to 1575 nm.

One embodiment of a phase mask is a flattened object made from a material which is transparent to light in the ultraviolet wavelength range. A series of evenly spaced grooves is formed in one of the flattened surfaces of the object to provide a grating structure. To eliminate the zeroth order diffraction pattern, a beam stop may be used. As an alternative to the beam stop, the depth of the grooves, times the refractive index of the substate, may be chosen to be an integral multiple of π to eliminate the zeroth order diffraction pattern, as is done in the conventional phase mask technique wherein the mask is essentially in contact with the photosensitive surface.

A second aspect of the invention is an apparatus for side writing a Bragg grating on an optical waveguide fiber, wherein the apparatus is adjustable so as to produce gratings effective over a range of wavelengths, i.e., gratings having a preselected period.

The apparatus comprises a light source which illuminates a phase mask. Light exits the phase mask as an array of divergent light rays. Optical means for collecting and directing the light are placed in the ray paths to cause the rays to overlap at points in space which define a plane called the interference plane. The overlapping light rays having optical path length differences less than or equal to the coherence length will interfere, producing a fringe pattern on the interference plane. The optical means for collecting and directing the light exiting the phase mask are adjustable so that the spacing between fringes in the interference plane can be adjusted. The apparatus includes a device for holding the long axis of the waveguide fiber in the interference plane. The zeroth order of diffraction may be removed by either of the methods noted above.

In a preferred embodiment of this aspect, the optical means for collecting and directing the light exiting the phase mask is a pair of mirrors arranged symmetrically about the phase mask. The mirrors are pivotally mounted so that the angle included between the mirror plane and the plane of the phase mask may be changed, thereby changing the spacing between fringes of the fringe pattern.

To produce gratings effective over a wavelength range of several hundred nanometers, each mirror must have a minimum adjustment of about +/−0.75° about an initial included angle chosen to be nominally 90°.

A preferred source is an excimer laser operating in the ultraviolet wavelength range of about 100 nm to 400 nm. Using an ultraviolet excimer laser source, a symmetrical change in the respective mirror angles of about 0.75° produces a change in fringe spacing in the range of about 435 nm to 540 nm.

These and other aspects of the invention will be discussed with the aid of the following drawings.

BRIEF DESCRIPTION OF THE DRAWINGS

FIG. 3 is an illustration of a grating formed in a phase mask.

DETAILED DESCRIPTION OF THE INVENTION

The novel method combines a simple interferometer with a phase mask to side write, in a waveguide optical fiber, a Bragg grating having a pre-selected period. The grating period is adjusted by pivoting elements of the interferometer. It will be understood that the method may be used to side write gratings in photosensitive glass objects other than waveguide fibers. Examples of such objects are planar waveguides or planar structures such as splitters.

The method is sufficiently robust for use in a manufacturing environment, because the elements of the interferometer are fixedly positioned except for the pivoting elements. Means for positioning the waveguide in the interference plane are also required. Such means, which include vacuum chucks mounted on a precision translating stage, are known in the waveguide fiber art. Techniques for holding an axis of an object in place and accurately pivoting the object about that axis are well known in the mechanical arts.

The intimate relation between the method and apparatus arises from the requirement of sharpness of grating structure, i.e., the sharpness or contrast between bright and dark fringes, and from the requirement that a range of grating periods are to made using very stable apparatus, i.e., an apparatus which is substantially fixedly positioned. The interference phenomenon provides the sharpness between illuminated and non-illuminated portions of the waveguide. The fixed position of light source and the axes of the interferometer light collecting and directing elements ensures apparatus flexibility, in terms of grating period, as well as stability and reliability.

Figure 1A:
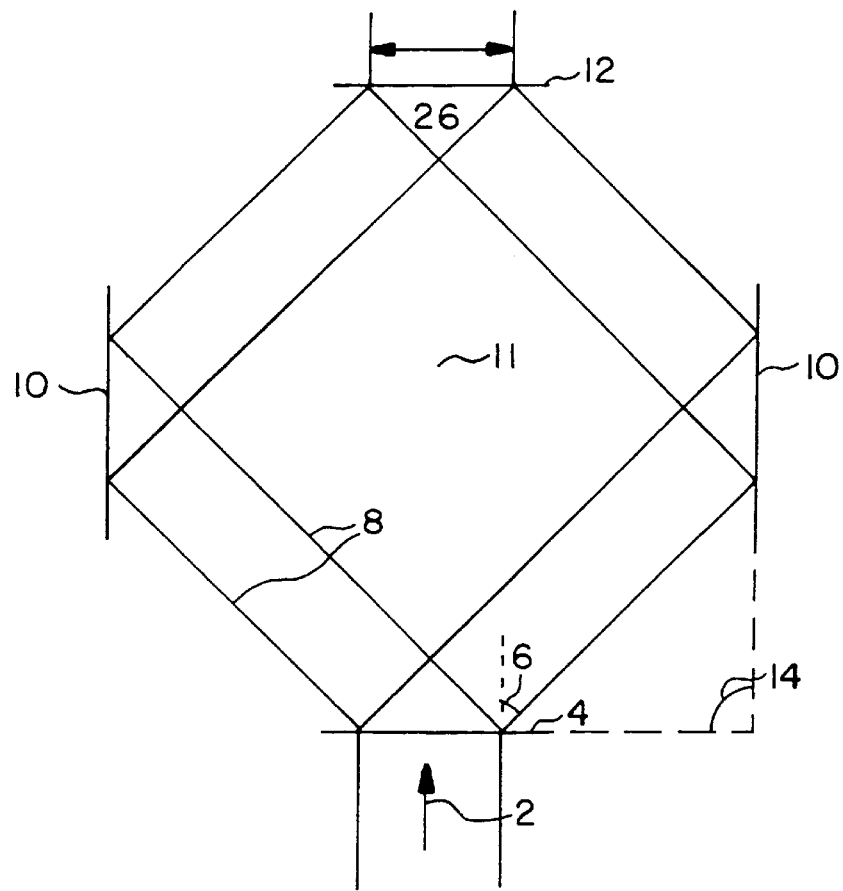
FIG. 1a shows the basic elements of the novel side writing apparatus.

The basic elements of the apparatus are shown in FIG. 1a. Light source 2 directs a beam of light onto phase mask 4. The elements, for collecting and directing light from the phase mask, are shown as plane mirrors, 10. It is, however, understood that these elements may be other simple or compound optical devices for collecting and directing light such as prism, lenses, non-plane mirrors or combinations of these. The mirror element is preferred because it provides simplicity and reliability of design of the interferometer. Elements 10 direct multiple rays 8 to overlap on the interference plane 12, where the rays interfere to produce a fringe pattern. Length 26 shows the linear dimension of the fringe pattern. Angle 6 is the half angle of the beam exiting the phase mask. The optional beam stop 11 is also shown.

The apparatus is shown in initial position. That is, angle 14, between plane mirror 10 and phase mask 4 is shown to be 90°. The magnitude of length 26, the length of the fringe pattern, is of interest in estimating the filtering capability of the grating photo-induced in a waveguide by the fringe pattern. If length 26 is too short, the filtering may be insufficient to meet a particular system requirement. However, it is noted that filtering efficiency in excess of 99% is possible with grating lengths of a few millimeters, a length well within the capability of the apparatus herein disclosed.

Figure 1B:
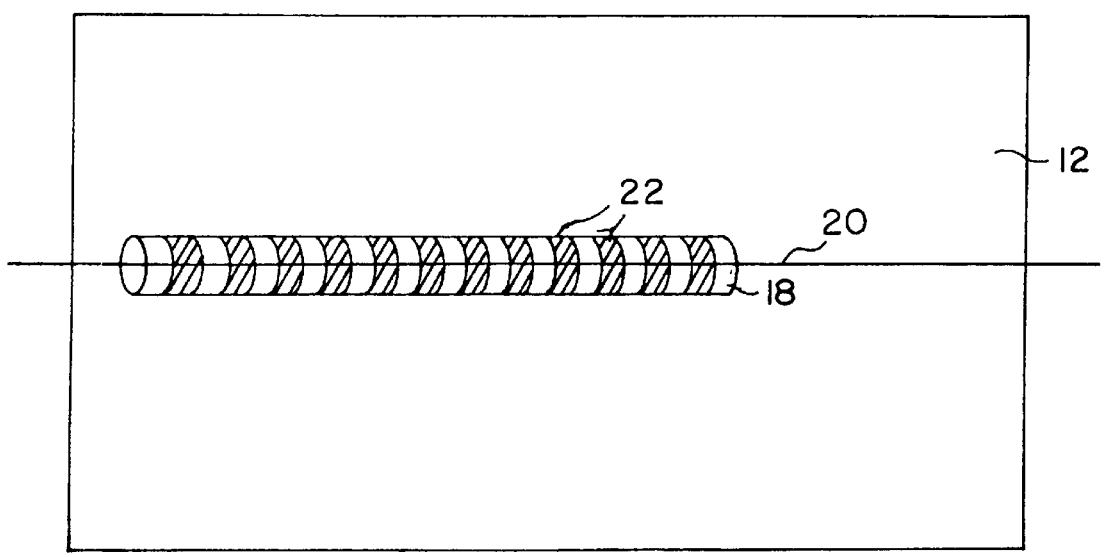
FIG. 1b shows a waveguide fiber in the interference plane with superimposed interference fringes.

In FIG. 1b, a waveguide fiber 18 is shown with its long axis 20 in the interference plane 12. Fringes 22 are incident on the waveguide, thereby producing, via the photosensitivity effect, periodic changes in refractive index along the waveguide axis. Locations in the waveguide which receive the bright fringes are increased in refractive index while those locations which receive substantially no light are left unchanged. Thus the interference fringes effectively write a Bragg reflection grating in the waveguide fiber.

Figure 2:
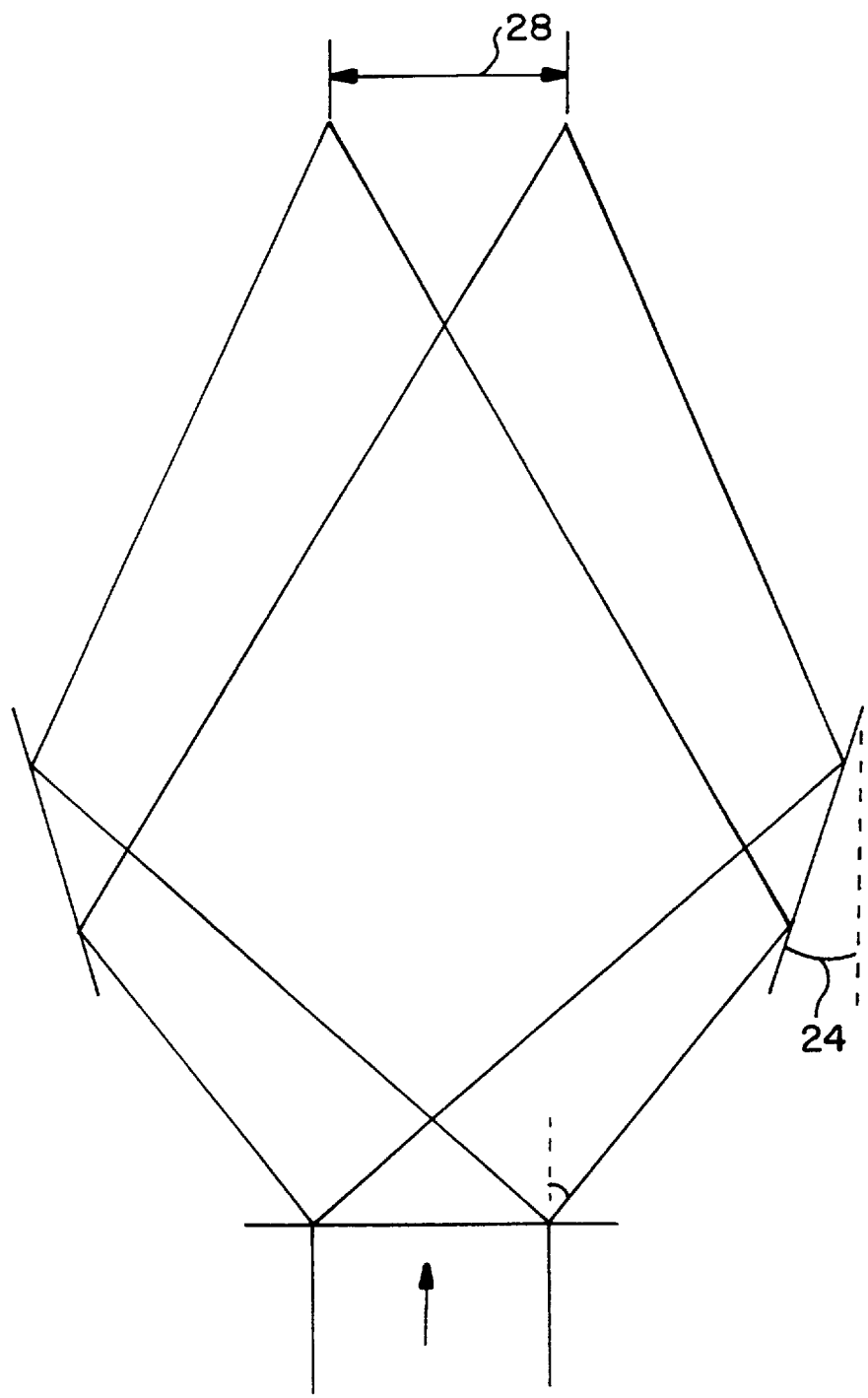
FIG. 2 illustrates the adjustability of the mirrors.

The novel apparatus, as illustrated in FIG. 2, shows the pivoting feature of the light collecting and directing interferometer elements. For the case shown, each plane mirror pivots about an axis fixed to one edge of the plane mirror and extending perpendicular to the plane of the drawing. The angle of pivot is labelled 24. As pivot angle 24 increases, the length of the fringe pattern 28 in the interference plane decreases. The fringe pattern length and thus the grating length photo-induced in the waveguide is more than sufficient for purposes of making the Bragg filters herein described.

Example-Bragg Gratings Covering the Wavelength Window 1275 nm to 1575 nm

An excimer laser, having a coherence length of about 300 μm and a center wavelength 248 nm, is used in conjunction with the apparatus of FIG. 2 to side write a grating in a waveguide core. The phase mask grating spacing and the parameters of the interferometer are chosen, setting angle 24 of FIG. 2, equal to zero, to yield a fringe pattern in the interference plane of period 1425 nm/2(1.46)=488 nm, where 1.46 is the refractive index of silica. This configuration of the apparatus allows a Bragg grating suitable for filtering 1425 nm light to be written on the waveguide core. The spatial period of the grating written in the waveguide is essentially the same as the fringe pattern period of the near field of the phase mask. By changing angle 24 of both mirrors symmetrically by 0.75°, a grating suitable for filtering 1575 nm can be as written on the waveguide core. By changing angle 24 of both mirrors by −0.750, a grating suitable for filtering 1275 nm may be written. For the instant apparatus, a positive angle change is made by pivoting the right side mirror clockwise and the left hand mirror counter clockwise about their respective axis.

Thus, the example apparatus is capable of writing Bragg gratings to filter wavelengths selected anywhere in the wavelength range 1275 nm to 1575 nm by making very small changes in angle 24. This discovery is advantageous for at least two reasons. First, it is generally true that better mechanical accuracy and precision can be achieved when the distance of travel of a component, which must be moved a very precise and repeatable amount, is relatively small. Second, the fringe pattern length in the interference plane is still quite large at the maximum required angle 24. A Bragg grating made at a larger angle 24 setting, i.e., a grating suitable for filtering 1575 nm, can have a length in the waveguide of more than 2 cm for the apparatus configuration of this example.

The grating length may be calculated from the general equation, $$2d = 2l\cos(\rho - 2\gamma)/\tan(2\gamma),$$

where, 2d is fringe pattern length 28 in FIG. 2, ρ is half angle 6 in FIG. 2, γ is angle 24 in FIG. 2, and l is the coherence length of the source, which is about 300 μm for the excimer laser source used in the example.

A typical phase mask is illustrated as 36 in FIG. 3. The groove width 32 is equal to the width of the plateau 30 between grooves. Groove depth 34, multiplied by the refractive index of the substrate, may be made equal to an integral multiple of π to provide destructive interference of the zeroth order diffraction pattern.

Other embodiments of the invention will be apparent to those skilled in the art. For example, the mirror pivot axis need not be at a mirror edge. Also, adjustable interferometer elements other than mirrors may be used.

Although particular embodiments of the invention have been herein disclosed and described, the invention is nonetheless limited only by the following claims.

I claim:

1. A method of side writing a grating in a photosensitive optical waveguide fiber comprising the steps:

a) positioning a phase mask, having first and second sides which are flat and parallel to each other, to receive, on the first side, light from a light source, the light being diffracted through said phase mask and exiting from the second side as an array of divergent light rays, the second side of said phase mask positioned as the light source for an interferometer, wherein the interferometer causes the light rays to overlap and form a pattern of interference fringes on an interference plane, the interferometer having adjustable optical elements to vary the spacing between fringes in the interference plane;

b) adjusting the optical elements to provide a pre-selected fringe spacing, wherein said optical elements include means for eliminating the zeroth order of diffraction; and, c) positioning the long axis of an optical waveguide fiber in the interference plane such that the pattern of interference fringes is incident on the waveguide fiber along the long axis;

wherein, the light source has a coherence length in the range of about 10 μm to 1000 μm.

2. The method of claim 1 wherein said adjustable optical elements are two plane mirrors and the included angle between each plane mirror and the phase mask is adjustable.

3. The method of claim 2 wherein the included angle is initially 90° and may be adjusted by at least +/−0.75 degrees.

4. The method of claim 3 wherein the spacing between corresponding points on adjacent fringes may be adjusted from about 435 nm to about 540 nm.

5. The method of claim 1 wherein the light source coherence length is about 100 μm and the wavelength range of the light source is about 100 nm to 400 nm.

6. The method of claim 1 wherein the wavelength of the light from the light source is in the range of about 100 nm to 600 nm.

7. The method of claim 1 wherein said means for eliminating the zeroth order diffraction pattern is a phase mask including a substrate and periodically spaced grooves formed therein, each groove having a depth, wherein each depth, multiplied by the refractive index of the substate material, is chosen to be an integral multiple of π.

8. The method of claim 1 wherein said means for eliminating the zeroth order diffraction pattern is a beam stop.

9. An apparatus for side writing a grating of pre-selected period in a photosensitive optical waveguide fiber comprising:

a light source having a coherence length in the range of 10 μm to 1000 μm;

a phase mask positioned to receive light from said light source and transmit the light as an array of diverging light rays;

optical means for eliminating the zeroth order diffraction pattern;

optical means for intercepting and redirecting the diverging light rays to overlap at a series of points in space which define an interference plane, the overlap of the light rays causing an interference fringe pattern to be formed on the interference plane, wherein said optical means are adjustable so that the spacing between interference fringes is adjustable;

means for fixedly positioning the long axis of an optical waveguide fiber in the interference plane such that the interference pattern is incident on the waveguide fiber along the long axis.

10. The apparatus of claim 9, wherein said optical means for intercepting and redirecting the divergent light rays is a pair of plane mirrors symmetrically positioned with respect to said phase mask and forming an included angle between the respective plane mirrors and said phase mask which is adjustable about a central value of 90°.

11. The apparatus of claim 10 wherein the amount of adjustment of the included angle is at least +/−0.75°.

12. The apparatus of claim 11 wherein the spacing between fringes varies from about 435 nm to 540 nm as each included angle is symmetrically varied between −0.75° and 0.75°.

13. The apparatus of claim 9 wherein the light source has a wavelength in the range of about 100 nm to 600 nm.

14. The apparatus of claim 13 wherein the light source is an excimer laser.

15. The apparatus of claim 14 wherein said excimer laser has a coherence length in the range of about 10 μm to 1000 μm.

16. The apparatus of claim 9 wherein the light source is an excimer laser having a wavelength in the range of about 100 nm to 400 nm and a coherence length of about 100 μm.

* * * * *